(12) United States Patent
Lu (10) Patent No.: US 9,131,431 B2
(45) Date of Patent: Sep. 8, 2015

(54) WIRELESS ACCESS POINT DEVICE, NETWORK SYSTEM AND NETWORK AUTO-ESTABLISHING METHOD OF THE SAME

(71) Applicant: ACCTON TECHNOLOGY CORPORATION, Hsinchu (TW)

(72) Inventor: Tan-Chun Lu, New Taipei (TW)

(73) Assignee: ACCTON TECHNOLOGY CORPORATION, Hsinchu (TW)

(*) Notice: Subject to any disclaimer, the term of this patent is extended or adjusted under 35 U.S.C. 154(b) by 231 days.

(21) Appl. No.: 13/969,612

(22) Filed: Aug. 19, 2013

(65) Prior Publication Data

US 2014/0204797 A1  Jul. 24, 2014

(30) Foreign Application Priority Data

Jan. 23, 2013  (TW) .............................. 102102492 A (51) Int. Cl.
*H04W 48/16* (2009.01)
*H04W 24/02* (2009.01)
*H04W 88/10* (2009.01)
*H04W 92/12* (2009.01)

(52) U.S. Cl.
CPC .............. *H04W 48/16* (2013.01); *H04W 24/02* (2013.01); *H04W 88/10* (2013.01); *H04W 92/12* (2013.01)

(58) Field of Classification Search
CPC ..... H04W 48/16; H04W 24/02; H04W 88/10; H04W 92/12
USPC .......................................................... 370/254
See application file for complete search history.

(56) References Cited

U.S. PATENT DOCUMENTS

| 2009/0141694 | A1* | 6/2009 | Shi ................................ 370/338 |
| 2014/0126466 | A1* | 5/2014 | Hamdi et al. ................. 370/328 |
| 2014/0226818 | A1* | 8/2014 | Wang et al. ................... 380/270 |

* cited by examiner

*Primary Examiner* — Melvin Marcelo
(74) *Attorney, Agent, or Firm* — CKC & Partners Co., Ltd.

(57) ABSTRACT

A method for automatically establishing a wireless network used in a wireless access point (AP) device is provided. The method comprises the steps outlined below. A first virtual AP unit is activated and operated in a provisional station mode according to a default configuration. The AP device determines whether the wireless AP device is connected to an access controller (AC), if the wireless AP device and the AC are connected, the wireless AP device communicates with the AC to perform a configuring process according to a retrieved configuration to activate a second virtual AP unit. The wireless AP device operates the second virtual AP unit in a configured mode and operates the first virtual AP unit in a provisional AP mode.

14 Claims, 6 Drawing Sheets

WIRELESS ACCESS POINT DEVICE, NETWORK SYSTEM AND NETWORK AUTO-ESTABLISHING METHOD OF THE SAME

RELATED APPLICATIONS

This application claims priority to Taiwan Application Serial Number 102102492, filed Jan. 23, 2013, which is herein incorporated by reference.

BACKGROUND

1. Technical Field

The present disclosure relates to a wireless network establishing technology. More particularly, the present disclosure relates to a wireless access point (AP) device, a network system and a network auto-establishing method of the same.

2. Description of Related Art

In recent technology, an access controller (AC) is used to control and manage a plurality wireless APs in a specific region such that the wireless communication devices neighboring to these wireless APs can perform communication with these wireless APs to further connect to the network to execute data transmission. For example, the protocol of the controlling and provisioning of wireless access points (CAPWAP) is a standard (RFC 5415 and 5416) developed by the internet engineering task force (IETF) for defining the standard of the AC to manage a group of wireless ends in the wireless network environment of 802.11. The protocol is in operation based on the internet protocol (IP) and the user datagram protocol (UDP). Therefore, the wireless APs have to obtain the network address and connect to the network before the it operates with the protocol.

In recent years, wireless network gradually becomes popular. Hence, more and more wireless networks need to be established. In order to reduce cost of wireless network establishment, the wireless distribution system (WDS) and the mesh network are used to automatically establish the wireless connection between the wireless APs in many modern technologies instead of establishing the wireless connection manually. However, since the protocol of CAPWAP is not supported in those two architectures, the AC can not manage the wireless APs correspondingly.

Accordingly, it is important to propose a method to automatically establish a temporary connection network to communicate with the AC to perform the configuration such that the wireless AP can joins the wireless network operated in the protocol of CAPWAP automatically to establish the wireless network automatically.

SUMMARY

An aspect of the present disclosure is to provide a method for automatically establishing a wireless network used in a wireless access point (AP) device, wherein the method comprises the steps outlined below. A first virtual AP unit is activated in the wireless AP device according to a default configuration and operating the first virtual AP unit in a provisional station mode. Whether the wireless AP device is connected to an access controller (AC) is determined. The AC is communicated with the wireless AP device while the wireless AP device is connected to the access controller. The wireless AP device executes a configuring process according to a retrieved configuration retrieved from the AC to activate a second virtual AP unit, operates the second virtual AP unit in a configured mode and operates the first virtual AP unit in a provisional AP mode.

Another aspect of the present disclosure is to provide a wireless AP device. The wireless AP device comprises a memory module, a network transmission module and a processing module. The memory module stores a default configuration comprising an initial identification code and an initial security configuration. The processing module activates a first virtual AP unit according to the default configuration, operates the first virtual AP unit in a provisional station mode and determines whether the wireless AP device is connected to an AC. The processing unit communicates with the AC while the wireless AP device is connected to the access controller. The wireless AP device executes a configuring process according to a retrieved configuration retrieved from the AC to activate a second virtual AP unit, operates the second virtual AP unit in a configured mode and operates the first virtual AP unit in a provisional AP mode.

Yet another aspect of the present disclosure is to provide a wireless AP network system. The wireless AP network system comprises an access controller (AC) and at least one wireless AP device. The AC connects to a server for further communicating with an external network. The wireless AP device comprises a memory module, a network transmission module and a processing module. The memory module stores a default configuration comprising an initial identification code and an initial security configuration. The processing module activates a first virtual AP unit according to the default configuration, operates the first virtual AP unit in a provisional station mode and determines whether the wireless AP device is connected to the AC. The processing unit communicates with the AC while the wireless AP device is connected to the access controller. The wireless AP device executes a configuring process according to a retrieved configuration retrieved from the AC to activate a second virtual AP unit, operates the second virtual AP unit in a configured mode and operates the first virtual AP unit in a provisional AP mode.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
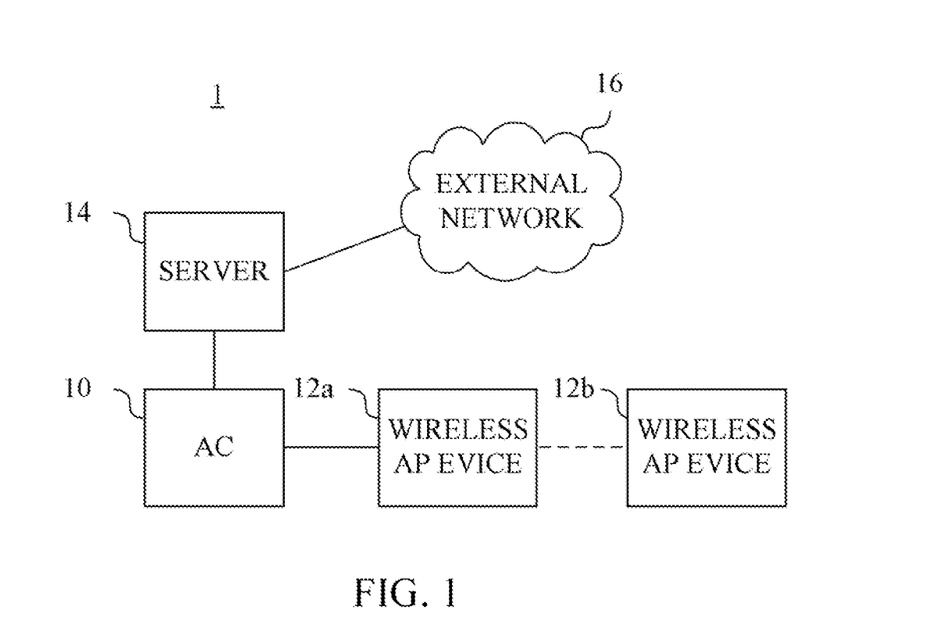
FIG. 1 is a block diagram of a wireless AP network system in an embodiment of the present disclosure.

FIG. 1 is a block diagram of a wireless AP network system 1 in an embodiment of the present disclosure. The wireless AP network system 1 comprises an access controller (AC) 10, wireless access point (WAP) devices 12a, 12b and a server 14.

The AC 10 communicates with an external network 16 through the server 14. The AC 10 manages the wireless AP devices according to a protocol of controlling and provisioning of wireless access points (CAPWAP). In the present embodiment, the AC 10 is disposed in a wireless local area network gateway or a network equipment for performing data exchanging with the external network 16 to control the data transmission of the wireless AP devices (e.g. the wireless AP devices 12a and 12b) within a specific area.

The wireless AP devices 12a and 12h transmits data packets from client devices to the external network 16 through the AC 10 and the server 14 after the wireless local area network is established. In the present embodiment, the external network 16 can be, but not limited to another local area network or internet. In FIG. 1, the establishment of the wireless local area network includes the physical connection between the wireless AP device 12a and the AC 10 through an Ethernet network and the wireless connection between the wireless AP devices 12a and 12b. The wireless AP device 12b is connected to the AC 10 through the wireless AP device 12a and further communicates with the external network 16.

Figure 2:
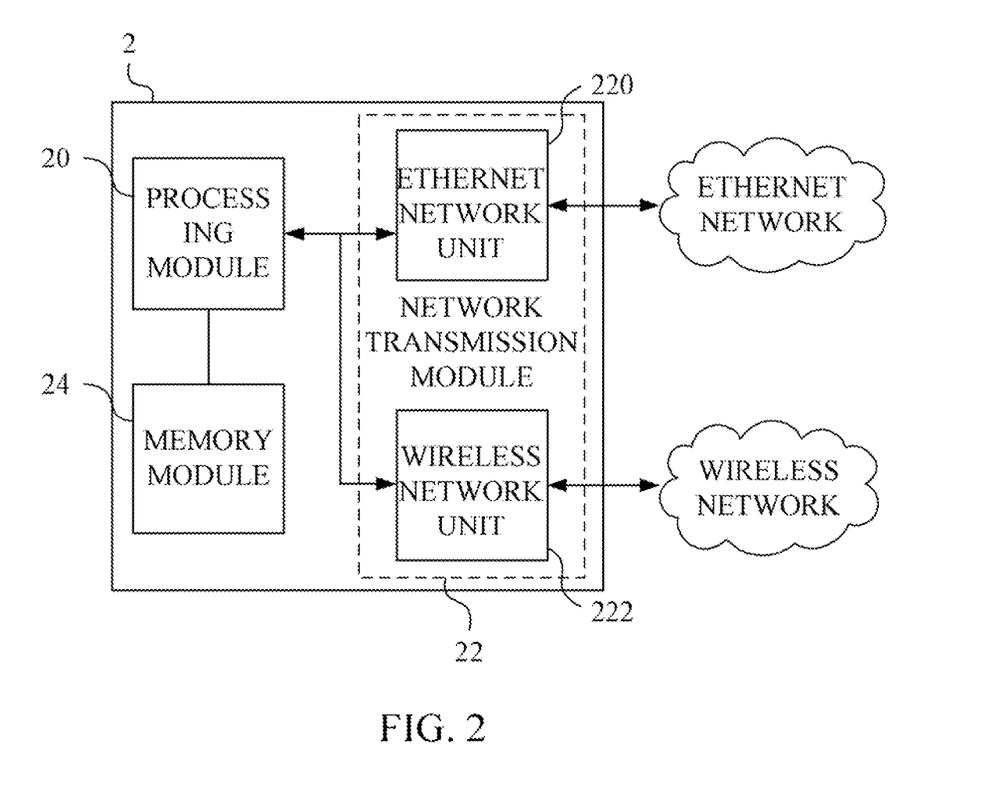
FIG. 2 is a block diagram of a wireless AP device in an embodiment of the present disclosure.

FIG. 2 is a block diagram of a wireless AP device 2 in an embodiment of the present disclosure. The structure of the wireless AP device 2 depicted in FIG. 2 can be applied to, but not limited to, the wireless AP device 12a and 12b depicted in FIG. 1. The wireless AP device 2 further comprises a processing module 20, a network transmission module 22 and a memory module 24.

The processing module 20 performs initialization when the wireless AP device 2 is activated and establishes a virtual AP unit by activating a virtual machine. The memory module 24 stores default configuration such that the processing module 20 executes the initialization and the configuring process during the establishment of the virtual AP unit accordingly.

The network transmission module 22 comprises an Ethernet network unit 220 and a wireless network unit 222. The Ethernet network unit 220 is configured to connect to the wireless AP device 2 with a physical Ethernet network. The wireless network unit 222 is configured to connect to the wireless AP device 2 with a wireless network. Thus, the wireless AP device 2 performs communication with other network devices through either the Ethernet network unit 220 or the wireless network unit 222 accordingly.

After the wireless AP device 2 is initialized, the processing module 20 establishes a first virtual AP unit according to the default configuration retrieved from the memory module 26 and operates the first virtual AP unit in a provisional station mode. In an embodiment, the default configuration contains, but not limited to, an initial identification code and an initial security configuration. Under such condition, the wireless AP device 2 is in an unmanaged state.

The processing module 20 of the wireless AP device 2 further determines whether the wireless AP device 2 is communicatively connected to the AC 10 depicted in FIG. 1.

In the present embodiment, the communicative connection between the wireless AP device 2 and the AC 10 can be categorized into two conditions: (I) The wireless AP device 2 and the AC 10 are connected physically through the Ethernet network; and (II) The wireless AP device 2 and the AC 10 are connected through other wireless AP devices by using an architecture of wireless distribution system (WDS).

Under the condition (I), the wireless AP device 2 first transmits a discovery signal through the Ethernet network unit 220 according to the default configuration. In an embodiment, the discovery signal is a discovery packet following protocol of the control and provisioning of wireless access points (CAPWAP). The AC 10 transmits a response signal after receiving the discovery signal such that the processing module 20 determines that the Ethernet network unit 220 is connected to the AC 10 through the Ethernet network while it receives the response signal. In an embodiment, the response signal can be a response packet following protocol of the CAPWAP.

Subsequently, the processing module 20 communicates with the AC 10 to retrieve configuration to activate a second virtual AP unit according to the configuration. The processing module 20 executes the configuring process of the second virtual AP. The processing module 20 further operates the second virtual AP unit in a configured AP mode.

In an embodiment, data of the configuration aforementioned includes, but not limited to, an assigned address, a wireless AP network identification code and wireless AP network security configuration.

For example, the configuring process sets the address of the second virtual AP unit as the assigned address, in which the assigned address is the network address within the local area network that the AC covers.

In another example, the second virtual AP unit sets its identification code and the network security configuration according to the configuring process such that it can perform communication in the local area network covered by the AC, in which the identification code and the network security configuration is set according to the wireless AP network identification code and wireless AP network security configuration retrieved from the AC. Hence, other devices can recognize the second virtual AP unit and perform communication with the second virtual AP unit after the configuring process.

The wireless AP device 2 therefore joins the local area network covered by the AC 10 successfully. The configured AP mode described above is a managed state, which means that the device is under control of the AC 10. In the managed state, the wireless AP device 2 can perform communication by using any network protocol supported by the AC 10.

The processing module 20 further operates the first virtual AP unit from the provisional station mode to a provisional AP mode. In VVDS architecture, when two wireless devices are connected in a wireless form, one of them acts as the AP and the other acts as the station. Hence, the first virtual AP unit that operates in the provisional AP mode can be connected by other virtual AP units that operate in the station mode.

Under the condition (II), the wireless AP device 2 first detects whether it can connect to an external wireless AP device. When the wireless AP device 2 can connect to the external wireless AP device, a provisional connection between them is established. In an embodiment, the provisional connection is established according to the WDS architecture.

Subsequently, the wireless AP device 2 transmits the discovery signal through the wireless network module 222 according to the default configuration. Similar to the steps in condition (I), the wireless AP device 2 communicates with the AC and retrieves the configuration setting after receiving the response signal from the AC through the wireless network unit 222. Furthermore, the second virtual AP unit is activated according to the configuration and a configuring process is performed thereon to operation the second virtual AP unit 30*b* in the configured AP mode.

The wireless AP device 2 therefore joins the local area network covered by the AC 10 successfully. The configured AP mode described above is the managed state, which means that the device is under the control of the AC 10. In the managed state, the wireless AP device 2 can perform communication by using any network protocol supported by the AC 10.

The processing module 20 further operates the first virtual AP unit from the provisional station mode to a provisional AP mode. As described above, the first virtual AP unit that operates in the provisional AP mode can be connected by other virtual AP units that operate in the station mode.

Hence, the wireless AP device 2 can automatically join the local area network covered by the AC 10 either in the condition I) or (II) by following the steps described above.

The detail process of the establishment of a wireless network system having wireless AP devices is described below.

FIGS. 3A to 3D are diagrams depicting the process of the automatic establishment of the wireless network system in an embodiment of the present disclosure. The two wireless AP devices 12*a*, 12*b* and the AC 10 depicted in FIG. 1 are used as an example in FIGS. 3A to 3D. It is noted that the wireless AP devices 12*a* and 12*b* can be implemented by the wireless AP device 2 in FIG. 2.

Figure 3A:
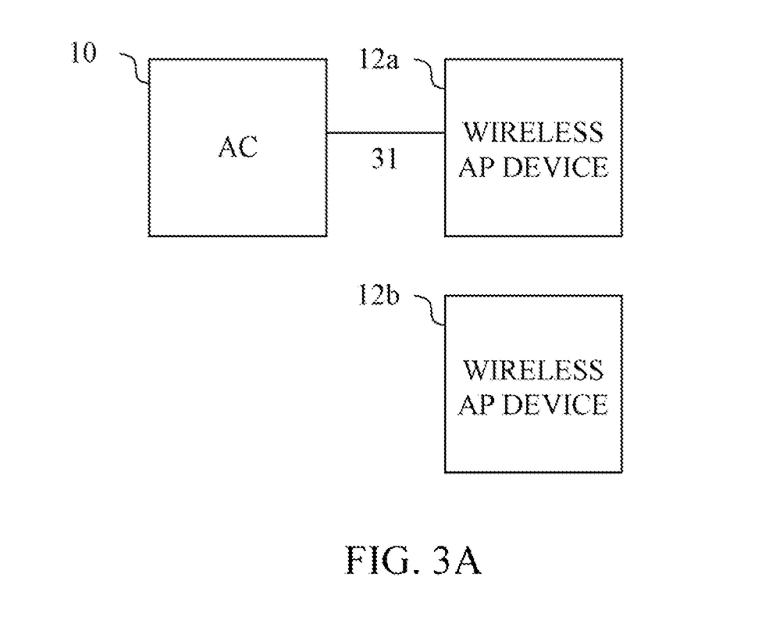
FIGS. 3A to 3D are diagrams depicting the process of the automatic establishment of the wireless network system in an embodiment of the present disclosure.
Figure 3B:
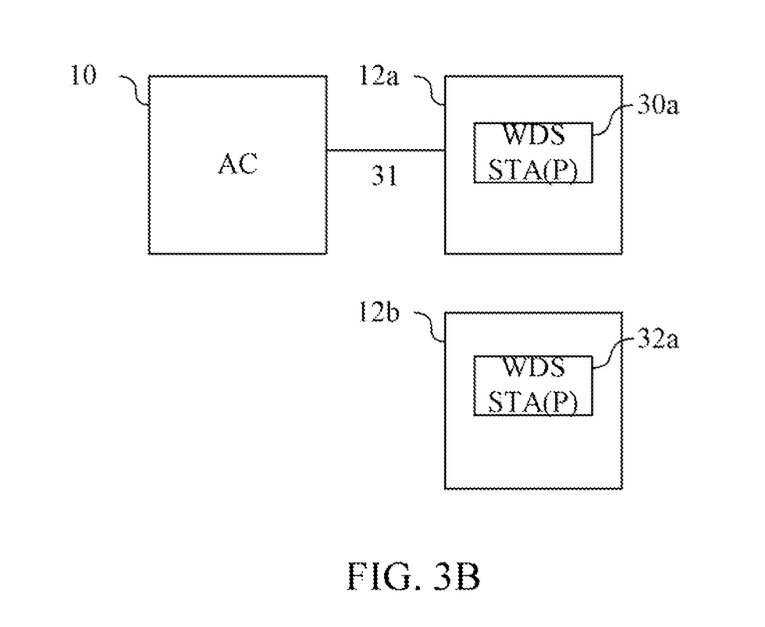

As shown in FIG. 3A, the wireless AP device 12*a* and 12*b* are not activated yet. In FIG. 3A, the wireless AP device 12*a* and the AC 10 are physically connected through the Ethernet network 31. It is noted that, the wireless AP device 12*a* and the AC 10 can be either connected directly or can be connected by cables through routers or switches As shown in FIG. 2 and FIG. 3B, after the wireless AP devices 12*a* and 12*b* are activated, the processing modules 20 of the devices activate the first virtual AP units 30*a* and 32*a*. In the present embodiment, each of the first virtual AP units 30*a* and 32*a* is a virtual machine. The processing module 20 further retrieves the default configuration stored in the memory module 26. The wireless AP device 12*a* and 12*b* activate the first virtual AP units 30*a* and 32*a* respectively and operate them in the provisional station mode WDS STA(P). Under such a condition, the wireless AP devices 12*a* and 12*b* are still in the unmanaged state.

The processing modules 20 of the wireless AP devices 12*a* and 12*b* determine that whether the wireless AP devices 12*a* and 12*b* are communicatively connected with the AC 10. In an embodiment, the wireless AP devices 12*a* and 12*b* can be connected to the AC 10 through the Ethernet network or through other wireless AP devices.

In an embodiment, the wireless AP devices 12*a* and 12*b* transmit the discovery signal through the Ethernet network unit 220 according to the aforementioned default configuration. The AC 10 further transmits the response signal after receiving the discovery signal. As the Ethernet network unit 220 receives the response signal, the processing module 20 determines that the Ethernet network unit 220 is connected to the AC 10 through the Ethernet network.

Since only the wireless AP device 12*a* is physically connected to the AC 10 through the Ethernet network 31, the wireless AP device 12*a* communicates with the AC 10 through the wired transmission to perform the configuring process.

Before the configuring process is finished, the wireless AP device 12*a* delivers the packets for requesting the configuration according to the protocol of the CAPWAP to retrieve the configuration from the AC 10 to perform the configuring process.

Figure 3C:
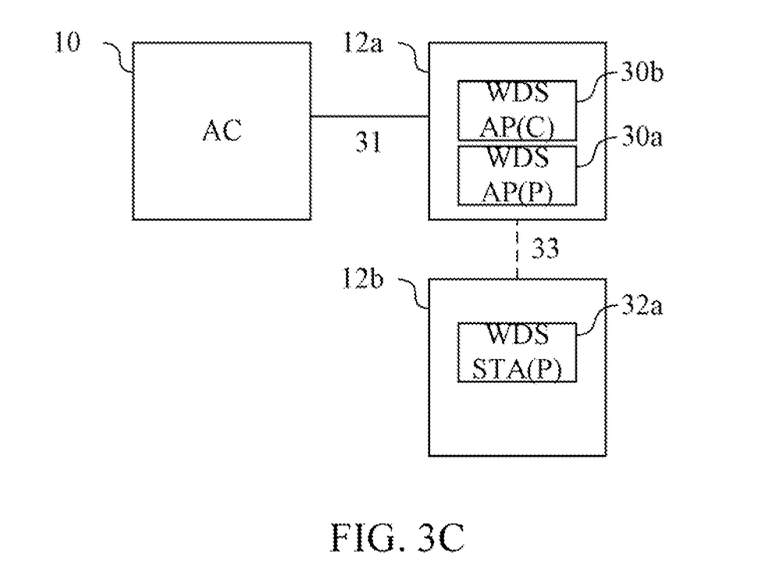

As shown in FIG. 3C, during the configuring process of the wireless AP device 12*a*, the processing module 20 activates the second virtual AP unit 30*b* according to the aforementioned configuration and operates the second virtual AP unit 30*b* in a configured AP mode VVDS AP(C). Consequently, the wireless AP device 12*a* joins the local area network of the AC 10. The configured AP mode WDS AP(C) is equivalent to the managed state, in which the wireless AP device 12*a* is under control of the AC 10. The wireless AP device 12*a* can communicate with the external network through the AC 10. It is noted that under the managed state, the wireless AP device 12*a* can perform communication according to any protocol that the AC 10 supports.

For the wireless AP device 12*a*, the processing module 20 further operates the first virtual AP unit 30*a* from the provisional station mode WDS STA(P) to the provisional AP mode WDS AP(P). As described above, the first virtual AP unit 30*a* that operates in the provisional AP mode WDS AP(P) can be connected by other virtual AP units that operate in the station mode.

On the other hand, since the wireless AP device 12*b* is not physically connected to the AC 10 through the Ethernet network, the processing module 20 of the wireless AP device 12*b* determines that whether its wireless network unit 222 is connected to the AC 10 through other wireless AP device.

At first, the wireless AP device 12*b* searches its neighboring area to check if there is any other wireless AP device that the wireless AP device 12*b* can be connected to. In the present embodiment, since the wireless AP device 12*a* has already established the first virtual AP unit 30*a* that operates in the provisional AP mode WDS AP (P), the wireless AP device 12*b* can find the wireless AP device 12*a*, connect with the wireless AP device 12*a* and establish the WDS connection 33 as shown in FIG. 3C. The wireless AP device 12*b* is connected to the wireless AP device 12*a* through the first virtual AP unit 32*a* that operates in the provisional station mode WDS STA (P).

The processing module 20 of the wireless AP device 12*b* further transmits the discovery signal to the AC 10 through the wireless AP device 12*a* according to the default configuration. In the present embodiment, the discovery signal is transmitted according to the protocol of CAPWAP.

When the wireless AP device 12*b* receives the response signal from the AC 10 through the wireless AP device 12*a*, the wireless AP device 12*b* determines that it is connected to the AC 10 through the wireless AP device 12*a*. The transmission and reception of the signal are performed by the wireless network unit 222 of the wireless AP device 12*b*.

When the wireless AP device 12*b* is connected to the AC 10 through the wireless AP device 12*a*, the wireless AP device 12*b* further communicates with the AC 10 through the wireless AP device 12*a* to perform the configuring process.

Similarly, before the configuring process is finished, the wireless AP device 12*b* communicates with the AC 10 according to the protocol of CAPWAP to retrieve the configuration from the AC 10 to perform the configuring process.

Figure 3D:
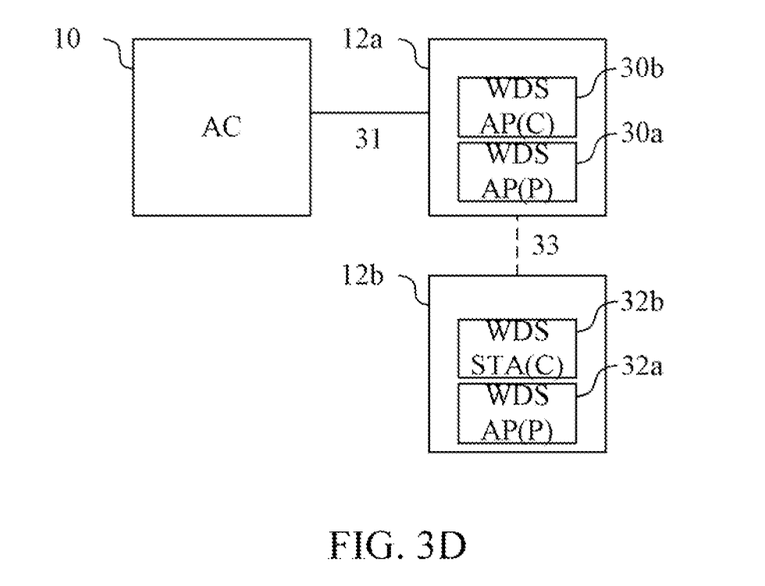

As shown in FIG. 3D, during the configuring process of the wireless AP device 12*b*, the processing module 20 activates the second virtual AP unit 32*b* according to the aforementioned configuration and operates the second virtual AP unit 32*b* in the configured station mode WDS STA(C). Consequently, the wireless AP device 12*b* joins the local area network of the AC 10 and is under the managed state, in which the wireless AP device 12*b* is under control of the AC 10. The wireless AP device 12b can communicate with the external network through the AC 10. It is noted that under the managed state, the wireless AP device 12b can perform communication according to any protocol that the AC 10 supports.

For the wireless AP device 12b, the processing module 20 further operates the first virtual AP unit 32a from the provisional station mode WIDS STA(P) to the provisional AP mode WDS AP(P). Therefore, the first virtual AP unit 32a that operates in the provisional AP mode WDS AP(P) can be connected by other virtual AP units that operate in the station mode.

By using the method described above, parts of the wireless AP device (such as the wireless AP device 12b) in the wireless AP network system 1 that are not connected to the AC 10 directly can actively search for the wireless network established by the AC 10, especially the wireless AP devices that already join the wireless network (such as the wireless AP device 12a) to perform the configuring process. After the configuring process is finished, the wireless AP device can join the wireless network and activate the virtual AP unit for other wireless AP device to connect to. Hence, under the protocol of CAPWAP, the AC can manage the wireless AP devices that are connected to the AC with the WDS structure by using the method of the present disclosure.

FIGS. 4A to 4D are diagrams depicting the process of the automatic establishment of the wireless network system in an embodiment of the present disclosure. Four wireless AP devices 12a, 12b, 12c, 12d and one AC 10 are used as an example in FIGS. 4A to 4D. It is noted that the wireless AP devices 12a, 12b, 12c and 12d can be implemented by the wireless AP device 2 in FIG. 2.

Figure 4A:
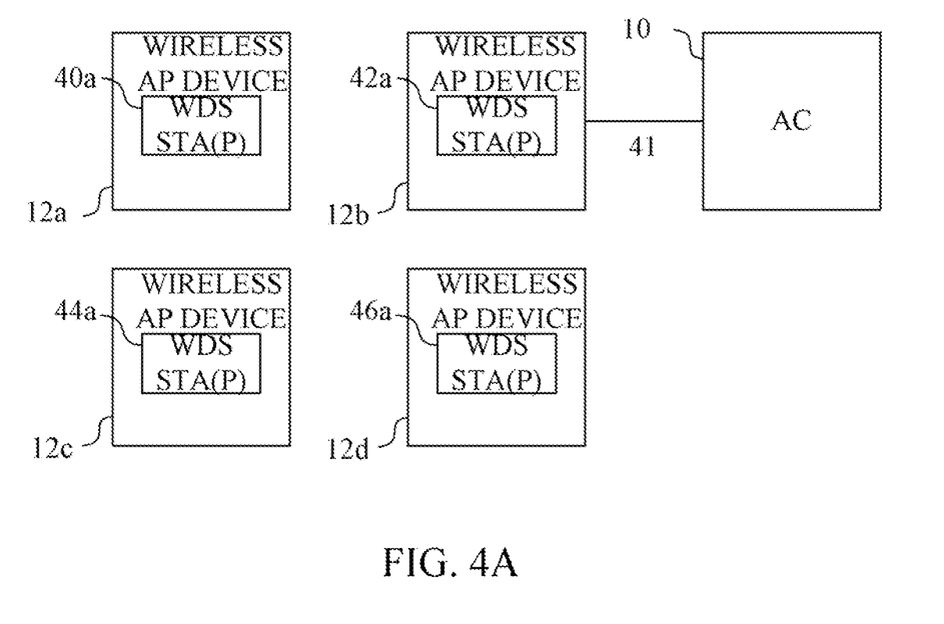
FIGS. 4A to 4D are diagrams depicting the process of the automatic establishment of the wireless network system in an embodiment of the present disclosure.

As shown in FIG. 4A, the wireless AP device 12b and the AC 10 are physically connected through the Ethernet network 41. The wireless AP devices 12a, 12c and 12d are independent to each other and are not physically connected to any other devices. It is noted that, besides the direction connection between the wireless AP device 12b and the AC 10, they can also be connected by cables through routers or switches.

After the wireless AP devices 12a, 12b, 12c and 12d are activated, the processing modules 20 of the devices activate the first virtual AP units 40a, 42a, 44a and 46a. In the present embodiment, each of the first virtual AP units 40a, 42a, 44a and 46a is a virtual machine. The processing module 20 further retrieves the default configuration stored in the memory module 26. The wireless AP device 12a and 12b activate the first virtual AP units 40a, 42a, 44a and 46a respectively and operate them in the provisional station mode VMS STA(P). Under such a condition, the wireless AP devices 12a, 12b, 12c and 12d are still in the unmanaged state.

As described in the previous embodiment, each of the wireless AP devices 12a, 12b, 12c and 12d transmit the discovery signal according to the default configuration. Since only the wireless AP device 12b is physically connected with the AC 10 through the Ethernet network 41, the wireless AP device 12b receives the response signal sent from the AC 10 and performs the configuring process. It is noted that the configuring process is performed according to the configuration from the AC 10.

Figure 4B:
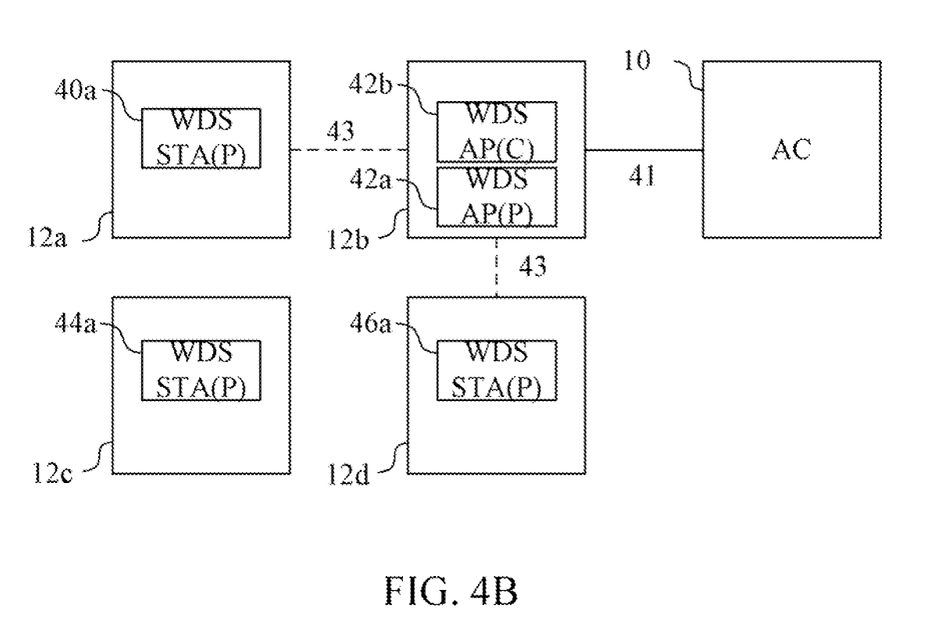

As shown in FIG. 4B, the processing module 20 activates the second virtual AP unit 42b when the wireless AP device 12b performs the configuring process and operates the second virtual AP unit 42b in the configured AP mode WDS AP (C). Consequently, the wireless AP device 12b joins the local area network of the AC 10 and is under the managed state. It is noted that under the managed state, the wireless AP device 12a can perform communication according to any protocol that the AC 10 supports.

For the wireless AP device 12b, the processing module 20 further operates the first virtual AP unit 42a from the provisional station mode WDS STA(P) to the provisional AP mode WDS AP(P). The first virtual AP unit 42a that operates in the provisional AP mode WDS AP(P) can therefore be connected by other virtual AP units that operate in the station mode.

On the other hand, since the wireless AP device 12a, 12b and 12d are not physically connected to the AC 10 through the Ethernet network, the processing module 20 of each of the wireless AP device 12a, 12b and 12d determines that whether it can be connected to other wireless AP devices in the neighboring area. In the present embodiment, since the wireless AP device 12a and 12d are close to the wireless AP device 12b, the wireless AP device 12a and 12d can find the wireless AP device 12b first and be connected to the first virtual AP unit 42a of the wireless AP device 12b by using the first virtual AP units 40a and 46a that operate in the provisional station mode WDS STA (P) to establish the WDS connection 43 depicted in FIG. 4B.

Figure 4C:
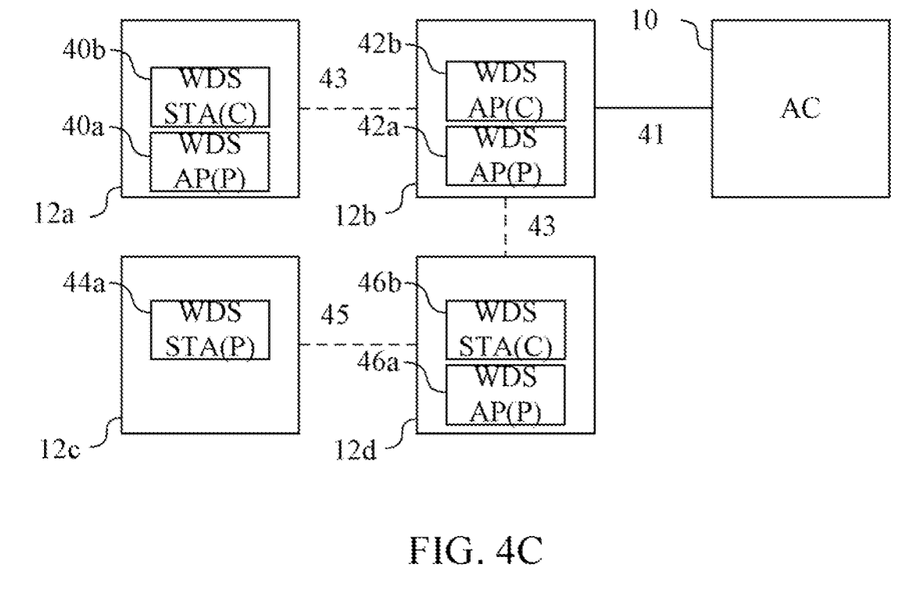

As shown in FIG. 4C, the wireless AP devices 12a and 12d activates the second virtual AP units 40b and 46b respectively after the configuring process and operate the second virtual AP units 40b and 46b in the configured station mode WDS STA (C). Consequently, the wireless AP devices 12a and 12d loin the local area network of the AC 10 and the wireless AP devices 12a and 12d are under the managed state. It is noted that under the managed state, the wireless AP device 12a and 12d can perform communication according to any protocol that the AC 10 supports.

The processing modules 20 of each of the wireless AP devices 12a and 12d further operate the first virtual AP units 40a and 46a from the provisional station mode WDS STA(P) to the provisional AP mode WDS AP(P). The first virtual AP units 40a and 46a that operate in the provisional AP mode WDS AP(P) can therefore be connected by other virtual AP units that operate in the station mode.

The wireless AP device 12c can find one of the wireless AP devices 12a and 12d and further be connected thereto. In the present embodiment, the wireless AP device 12c is connected to the first virtual AP unit 46a of the wireless AP device 12d by using the first virtual AP unit 44a that operates in the provisional station mode WDS STA (P) to establish the WDS connection 45 depicted in FIG. 4C.

Figure 4D:
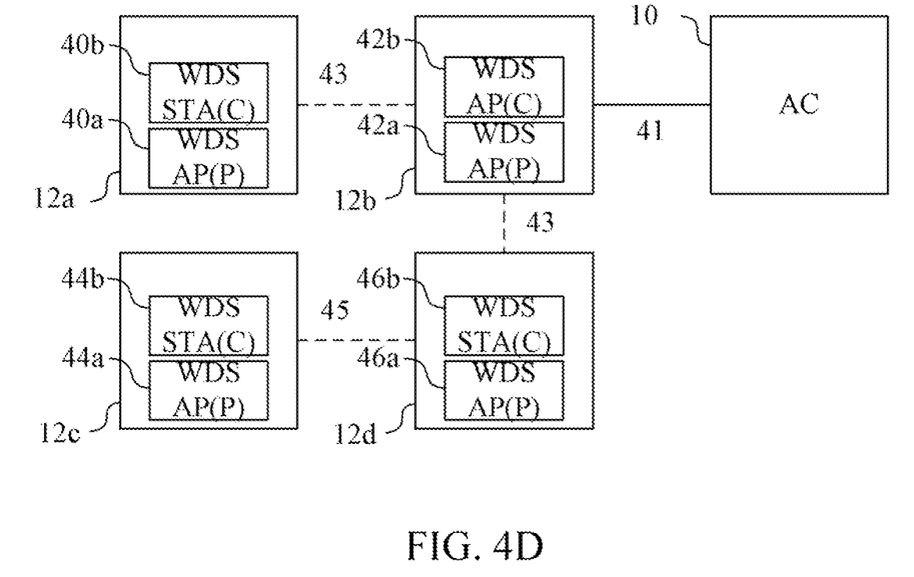

As shown in FIG. 4D, the wireless AP device 12c activates the second virtual AP unit 44b after the configuring process and operates the second virtual AP unit 44b in the configured station mode WDS STA (C). Consequently, the wireless AP device 12c joins the local area network of the AC 10 and is under the managed state. It is noted that under the managed state, the wireless AP device 12c can perform communication according to any protocol that the AC 10 supports.

The processing modules 20 of the wireless AP device 12c further operate the first virtual AP unit 44a from the provisional station mode WDS STA(P) to the provisional AP mode WDS AP(P). The first virtual AP unit 44a that operate in the provisional AP mode WDS AP(P) can therefore be connected by other virtual AP units that operate in the station mode.

By using the method described above, parts of the wireless AP device (such as the wireless AP device 12b) in the wireless AP network system 1 that are not connected to the AC 10 directly can actively search for the wireless network established by the AC 10, especially the wireless AP devices that already join the wireless network (such as the wireless AP device 12a) to perform the configuring process. After the configuring process is finished, the wireless AP device can join the wireless network and activate the virtual AP unit for other wireless AP device to connect. Hence, under the protocol of CAPWAP, the AC can manage the wireless AP devices that are connected to the AC with the WDS structure in a mesh network form by using the method of the present disclosure.

Since the wireless AP device can perform an active search, when parts of the wireless AP devices malfunction, the other wireless AP devices can automatically detect the devices that are still in operation and be connected thereto. Take the local area network depicted in FIG. 4D as an example, if the wireless AP device 12d that the wireless AP device 12c is connected to malfunctions such that the wireless AP device 12c can not connect to the local area network, the wireless AP device 12c can perform the active search and find the wireless AP device 12a that is still in operation. The configuring process is performed subsequently to allow the wireless AP device 12c to be connected to the local area network through the wireless AP device 12a.

It is noted that in the above embodiments, the systems having two wireless AP devices and four wireless AP devices are used as examples. In other embodiments, different number of the wireless AP devices can be used in the network system and is not limited by the number described in the previous embodiments.

Figure 5:
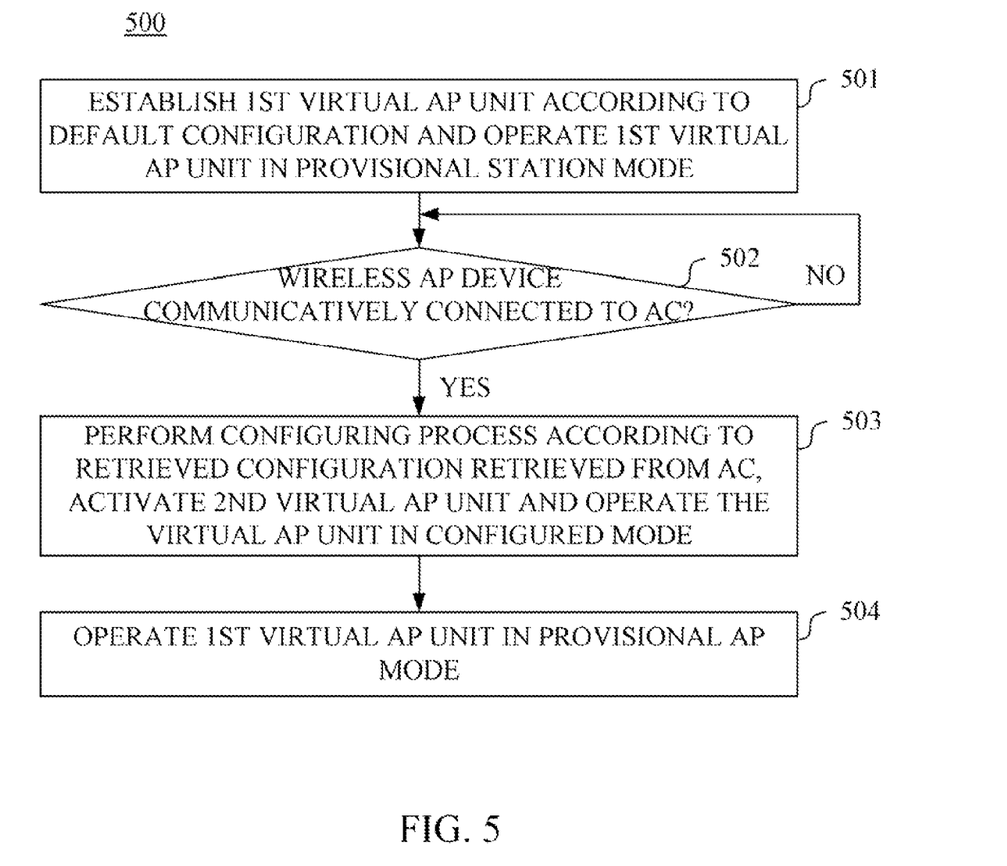
FIG. 5 is a flow chart of a method for automatically establishing a wireless network in an embodiment of the present disclosure.

FIG. 5 is a flow chart of a method 500 for automatically establishing a wireless network in an embodiment of the present disclosure. The method 500 is used in the wireless AP device 2 depicted in FIG. 2 or used in the wireless AP network system 1 depicted in FIG. 1. The method 500 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 501, the processing module of the wireless AP device activates the first virtual AP unit according to the default configuration and operates the first virtual AP in a provisional station mode.

In step 502, the processing module determines whether the wireless AP device is connected to the AC. When the wireless AP device is not connected to the AC, the flow goes back to step 502 to keep performing the determination.

In step 503, the processing module communicates with the AC when the wireless AP device is connected to the AC. The processing module further performs the configuring process according to the configuration setting retrieved from the AC to activate the second virtual AP unit and operates it in the configured mode.

In step 504, the processing module operates the first virtual AP unit in the provisional AP mode.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. A method for automatically establishing a wireless network used in a wireless access point (AP) device, the method comprises following steps:

activating a first virtual AP unit in the wireless AP device according to a default configuration and operating the first virtual AP unit in a provisional station mode;

determining whether the wireless AP device is connected to an access controller (AC); and communicating with the AC while the wireless AP device is connected to the access controller, the wireless AP device executing a configuring process according to a retrieved configuration retrieved from the AC to activate a second virtual AP unit, operating the second virtual AP unit in a configured mode and operating the first virtual AP unit in a provisional AP mode.

2. The method of claim 1, wherein the step of determining whether the wireless AP device is connected to the AC further comprises:

transmitting a discovery signal according to the default configuration; and determining that the wireless AP device is connected to the AC through an Ethernet network as an AC response signal being received through an Ethernet network unit.

3. The method of claim 1, wherein the step of determining whether the wireless AP device is connected to the AC further comprises:

establishing a provisional connection between the wireless AP device and an external wireless AP device when the external wireless AP device is detected;

transmitting a discovery signal to the external wireless AP device according to the default configuration data; and determining that the wireless AP device is connected to the AC through the external wireless AP device as an AC response signal being received through the external wireless AP device and a wireless network unit.

4. The method of claim 3, wherein the provisional connection is a wireless distribution system (WDS) connection.

5. The method of claim 2 further comprising following steps:

setting the configured mode as a configured AP mode when it is determined the wireless AP device is connected to the AC through the Ethernet network.

6. The method of claim 3 further comprising following steps:

setting the configured mode as a configured station mode when it is determined the wireless AP device is connected to the AC through the external wireless AP device.

7. The method of claim 1, wherein the step of activating the first virtual AP unit further comprises:

retrieving the default configuration contains an initial identification code and an initial security configuration from a memory module to activate the first virtual AP unit accordingly.

8. A wireless AP device comprising:

a memory module for storing a default configuration, the default configuration further comprising an initial identification code and an initial security configuration;

a network transmission module; and a processing module for activating a first virtual AP unit according to the default configuration, operating the first virtual AP unit in a provisional station mode and determining whether the wireless AP device is connected to an AC;

wherein the processing unit communicates with the AC while the wireless AP device is connected to the access controller, the wireless AP device executes a configuring process according to a retrieved configuration retrieved from the AC to activate a second virtual AP unit, operates the second virtual AP unit in a configured mode and operates the first virtual AP unit in a provisional AP mode.

9. The wireless AP device of claim 8, wherein the processing module establishes a provisional connection with the external wireless AP device while an external wireless AP device is detected, the processing module transmits a discovery signal to the external wireless AP device according to the default configuration and determines that the wireless AP device is connected to the AC through the external wireless AP device as an AC response signal is received through the external wireless AP device and a wireless network unit of the network transmission module.

10. The wireless AP device of claim 8, wherein the processing module sets the configured mode as a configured AP mode when it is determined the wireless AP device is connected to the AC through the Ethernet network.

11. The wireless AP device of claim 10, wherein the processing module sets the configured mode as a configured station mode when it is determined the wireless AP device is connected to the AC through the external wireless AP device.

12. A wireless AP network system comprising:
   an access controller (AC) connecting to a server for further communicating with an external network; and
   at least one wireless AP device comprising:
      a memory module storing a default configuration containing an initial identification code and an initial security configuration;
      a network transmission module; and
      a processing module for activating a first virtual AP unit according to the default configuration, operating the first virtual AP unit in a provisional station mode and determining whether the wireless AP device is connected to the AC;
   wherein the processing unit communicates with the AC while the wireless AP device is connected to the access controller, the wireless AP device executes a configuring process according to a retrieved configuration retrieved from the AC to activate a second virtual AP unit, operate the second virtual AP unit in a configured mode and operate the first virtual AP unit in a provisional AP mode.

13. The wireless AP network system of claim 12, wherein the processing module transmits a discovery signal according to the default configuration and determines that the wireless AP device is connected to the AC through a Ethernet network as an AC response signal is received through an Ethernet network unit of the network transmission module.

14. The wireless AP network system of claim 12, wherein the processing module establishes a provisional connection with the external wireless AP device while an external wireless AP device is detected by the wireless AP device, the processing module transmits a discovery signal to the external wireless AP device according to the default configuration and determines that the wireless AP device is connected to the AC through the external wireless AP device as an AC response signal is received through the external wireless AP device and a wireless network unit of the network transmission module.

* * * * *